US009608377B1

(12) United States Patent
Phillips

(10) Patent No.: US 9,608,377 B1
(45) Date of Patent: Mar. 28, 2017

(54) CAGED ELECTRICAL CONNECTOR ASSEMBLIES HAVING INDICATOR LIGHTS

(71) Applicant: TYCO ELECTRONICS CORPORATION, Berwyn, PA (US)

(72) Inventor: Michael John Phillips, Camp Hill, PA (US)

(73) Assignee: TE CONNECTIVITY CORPORATION, Berwyn, PA (US)

(*) Notice: Subject to any disclaimer, the term of this patent is extended or adjusted under 35 U.S.C. 154(b) by 0 days.

(21) Appl. No.: 14/971,005

(22) Filed: Dec. 16, 2015

(51) Int. Cl.
H01R 13/646 (2011.01)
F21V 8/00 (2006.01)
H01R 13/717 (2006.01)
H01R 25/00 (2006.01)

(52) U.S. Cl.
CPC ........... H01R 13/646 (2013.01); G02B 6/001 (2013.01); H01R 13/7175 (2013.01); H01R 25/006 (2013.01)

(58) Field of Classification Search
USPC ...... 439/607.21, 607.001, 607.025, 626, 487
See application file for complete search history.

(56) References Cited

U.S. PATENT DOCUMENTS

| 6,165,006 | A  | * | 12/2000 | Yeh | H01R 13/6641 |
| | | | | | 439/490 |
| 6,431,765 | B1 | * | 8/2002  | Chen | G02B 6/4277 |
| | | | | | 385/139 |
| 7,387,527 | B2 | * | 6/2008  | Kim | G02B 6/4201 |
| | | | | | 439/372 |
| 7,661,983 | B2 | * | 2/2010  | Yang | H01R 4/02 |
| | | | | | 439/490 |
| 7,920,125 | B2 | * | 4/2011  | Imamura | G06F 1/1616 |
| | | | | | 108/23 |
| 7,974,098 | B2 | * | 7/2011  | Oki | G02B 6/4201 |
| | | | | | 165/185 |
| 8,135,282 | B2 | * | 3/2012  | Hosking | H04B 10/40 |
| | | | | | 398/135 |
| 8,292,516 | B2 | * | 10/2012 | Little | G02B 6/3817 |
| | | | | | 385/76 |
| 8,335,416 | B2 | * | 12/2012 | Shirk | G02B 6/0008 |
| | | | | | 385/146 |
| 8,638,233 | B2 | * | 1/2014  | Aguren | G02B 6/4292 |
| | | | | | 340/815.42 |
| 8,823,540 | B2 | * | 9/2014  | Scholeno | H01R 12/716 |
| | | | | | 340/815.4 |
| 8,861,972 | B2 | * | 10/2014 | Hosking | H04B 10/40 |
| | | | | | 398/135 |

(Continued)

Primary Examiner — Alexander Gilman

(57) ABSTRACT

An electrical connector assembly includes a cage member having a plurality of walls defining a port configured to receive a pluggable module therein through a front end of the cage member. The port extends to a rear end of the cage member. The walls are manufactured from a conductive material and provide electrical shielding. A communication connector is disposed within the cage member and is positioned at the rear end of the cage member to mate with the pluggable module when the pluggable module is inserted into the port. The communication connector has a mating face being forward facing. A communication connector light pipe is mounted to the communication connector and provided at the mating face. The communication connector light pipe has an emitting face emitting light into the pluggable module.

19 Claims, 4 Drawing Sheets

(56) References Cited

U.S. PATENT DOCUMENTS

| | | | | |
|---|---|---|---|---|
| 8,864,523 B2* | 10/2014 | Banakis | ............ | H01R 13/6585 439/607.25 |
| 9,252,882 B2* | 2/2016 | Chien | ................ | G02B 6/4277 |
| 9,281,636 B1* | 3/2016 | Schmitt | ............ | H01R 13/7175 |
| 9,391,407 B1* | 7/2016 | Bucher | ............ | H01R 13/6581 |
| 2004/0042710 A1* | 3/2004 | Margalit | ............ | G02B 6/29362 385/24 |
| 2005/0018967 A1* | 1/2005 | Huang | ................ | G02B 6/2746 385/39 |
| 2005/0254257 A1* | 11/2005 | Long | ................... | G02B 6/0001 362/581 |
| 2005/0254772 A1* | 11/2005 | Long | ................... | G02B 6/0008 385/146 |
| 2007/0147844 A1* | 6/2007 | Harres | ................ | H04B 10/504 398/135 |
| 2007/0253168 A1* | 11/2007 | Miller | ................ | G02B 6/4246 361/719 |
| 2008/0242127 A1* | 10/2008 | Murr | ................... | H01R 13/665 439/79 |
| 2009/0129725 A1* | 5/2009 | Durrant | ................ | G02B 6/4201 385/14 |
| 2009/0269962 A1* | 10/2009 | Miller | ................ | H01R 13/6275 439/345 |
| 2009/0274422 A1* | 11/2009 | Henry | ................ | H01R 13/7172 385/92 |
| 2010/0111476 A1* | 5/2010 | Shirk | ................... | G02B 6/0008 385/53 |
| 2011/0300757 A1* | 12/2011 | Regnier | ................ | H01R 29/00 439/626 |
| 2012/0083156 A1* | 4/2012 | Fogg | ................ | H01R 13/6587 439/607.25 |
| 2012/0196477 A1* | 8/2012 | Nichols | ................ | H01R 13/518 439/607.01 |
| 2013/0186681 A1* | 7/2013 | Wickes | ................ | H05K 9/0009 174/382 |
| 2014/0080352 A1* | 3/2014 | Xue | ................... | G02B 6/4261 439/487 |
| 2015/0171558 A1* | 6/2015 | Yu | ........................... | H01R 12/58 439/607.01 |
| 2016/0064873 A1* | 3/2016 | Bucher | ............ | H01R 12/7076 385/88 |

* cited by examiner

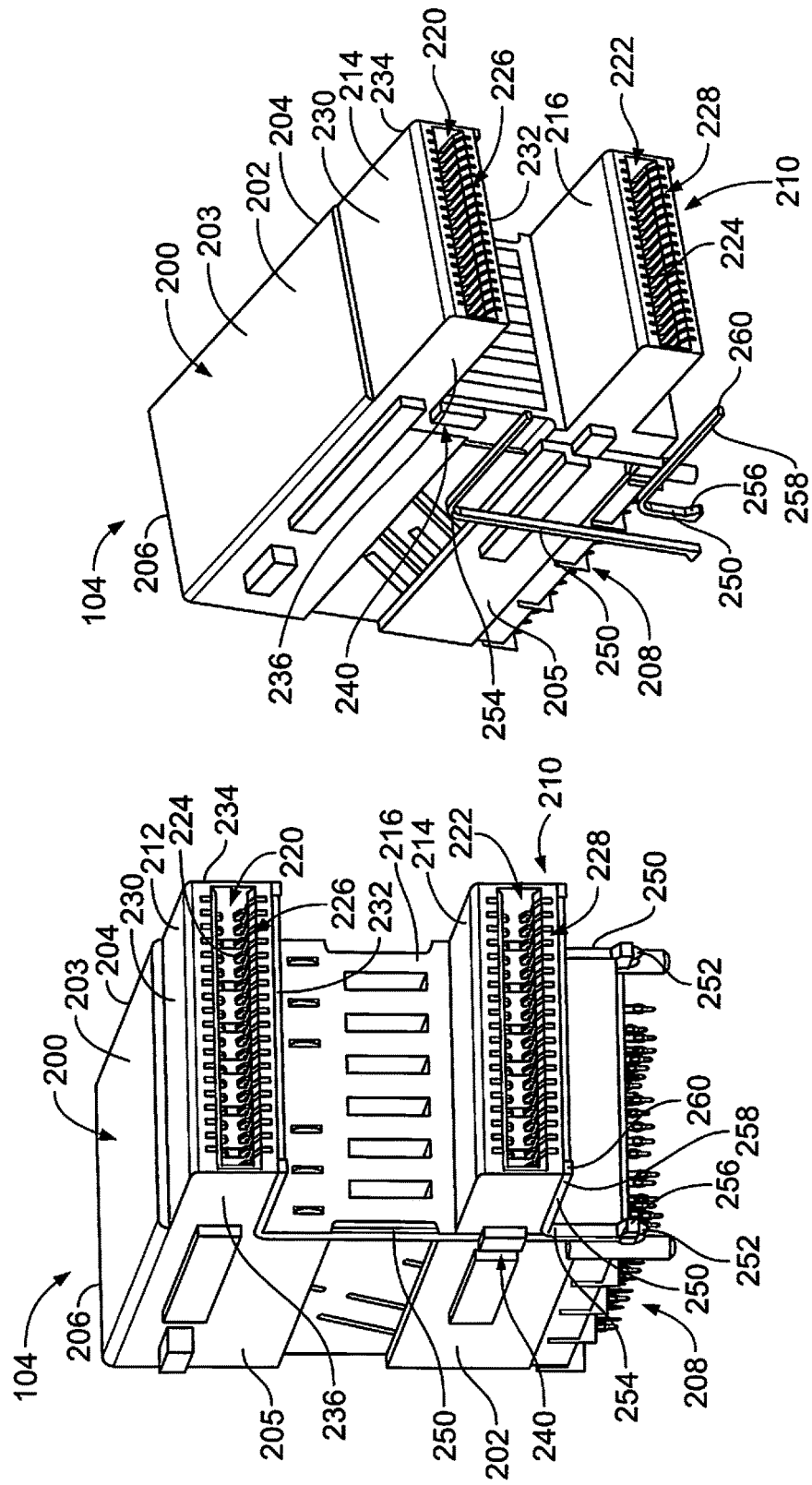

CAGED ELECTRICAL CONNECTOR ASSEMBLIES HAVING INDICATOR LIGHTS

BACKGROUND OF THE INVENTION

The subject matter herein relates generally to caged electrical connector assemblies for high speed optical and electrical communication systems.

It is known to provide a metal cage with a plurality of ports, whereby transceiver modules are pluggable therein. Several pluggable module designs and standards have been introduced in which a pluggable module plugs into a receptacle which is electronically connected to a host circuit board. For example, a well-known type of transceiver developed by an industry consortium is known as a gigabit interface converter (GBIC) or serial optical converter (SOC) and provides an interface between a computer and a data communication network such as Ethernet or a fiber network. These standards offer a generally robust design which has been well received in industry.

It is desirable to increase the operating frequency of the network connections. Electrical connector systems that are used at increased operating speeds present a number of design problems, particularly in applications in which data transmission rates are high, for example, in the range above 10 Gbps (Gigabits/second). One concern with such systems is reducing electromagnetic interference (EMI) emissions. Another concern is reducing operating temperatures of the transceivers.

In conventional designs, thermal cooling is achieved by using a heat sink and/or airflow over the outside of the shielding metal cage surrounding the receptacles. However, the thermal cooling provided by conventional designs is proving to be inadequate, particularly for pluggable modules in interior or lower ports, which tend to have less cage wall surface area exposed to airflow for cooling. Some pluggable module designs have incorporated heat dissipating fins into the pluggable modules to increase the surface area exposed to airflow along the shells of the pluggable modules, such as with the fins extending from the tops of the pluggable modules. Cage designs have been designed to accommodate the pluggable modules with the heat dissipating fins, such as by eliminating the central channel between stacked pluggable modules to accommodate the taller pluggable modules. However, the channels were previously used for routing light pipes to provide connector status indicators at the front face of the systems. By eliminating the channels, the space for routing light pipes has also been eliminated.

A need remains for an electrical connector assembly having improved thermal cooling and providing connector status indication at the front face of the cage.

BRIEF DESCRIPTION OF THE INVENTION

In one embodiment, an electrical connector assembly is provided including a cage member having a plurality of walls defining a port configured to receive a pluggable module therein through a front end of the cage member. The port extends to a rear end of the cage member. The walls are manufactured from a conductive material and providing electrical shielding. A communication connector is disposed within the cage member and is positioned at the rear end of the cage member to mate with the pluggable module when the pluggable module is inserted into the port. The communication connector has a mating face being forward facing. A communication connector light pipe is mounted to the communication connector and provided at the mating face. The communication connector light pipe has an emitting face emitting light into the pluggable module.

In another embodiment, an electrical connector assembly is provided including a cage member having a plurality of walls defining a port extending between a front end and a rear end of the cage member. The walls are manufactured from a conductive material and provide electrical shielding. A communication connector is disposed within the cage member and is positioned at the rear end of the cage member. The communication connector has a mating face being forward facing. The communication connector has a circuit card receiving slot and a plurality of contacts at the circuit card receiving slot. A communication connector light pipe is mounted to the communication connector and provided at the mating face. The communication connector light pipe has an emitting portion emitting light therefrom. A pluggable module is received in the port. The pluggable module has a circuit card held in a chamber of a shell. The shell extends between a mating end and a cable end of the pluggable module. The pluggable module is mated with the communication connector such that the circuit card is received in the circuit card receiving slot and is electrically connected to the contacts of the communication connector. A pluggable module light pipe extends generally between the mating end and the cable end of the pluggable module. The pluggable module light pipe has a receiving portion receiving light from the emitting portion of the communication connector light pipe. The pluggable module light pipe has an indicator portion opposite the receiving portion and provided at the cable end. The indicator portion emits light received from the communication connector light to indicate a connection status of the pluggable module with the communication connector.

In a further embodiment, an electrical connector assembly is provided including a cage member having a plurality of walls defining a port extending between a front end and a rear end of the cage member. The walls are manufactured from a conductive material and provide electrical shielding. A communication connector is disposed within the cage member and is positioned at the rear end of the cage member. The communication connector has a mating face that is forward facing. The communication connector has a circuit card receiving slot and a plurality of contacts at the circuit card receiving slot. A pluggable module is received in the port. The pluggable module has a circuit card held in a chamber of a shell. The shell extends between a mating end and a cable end of the pluggable module. The pluggable module is mated with the communication connector such that the circuit card is received in the circuit card receiving slot and is electrically connected to the contacts of the communication connector. A pluggable module light pipe is received in the chamber of the shell of the pluggable module. The pluggable module light pipe has an indicator portion provided at the cable end of the pluggable module. The indicator portion emits light to indicate a connection status of the pluggable module with the communication connector.

BRIEF DESCRIPTION OF THE DRAWINGS

FIG. 2 is a front perspective view of a communication connector of the electrical connector assembly in accordance with an exemplary embodiment with communication connector light pipes.

FIG. 3 is a front perspective view of the communication connector with the communication connector light pipes poised for assembly.

DETAILED DESCRIPTION OF THE INVENTION

Figure 1:
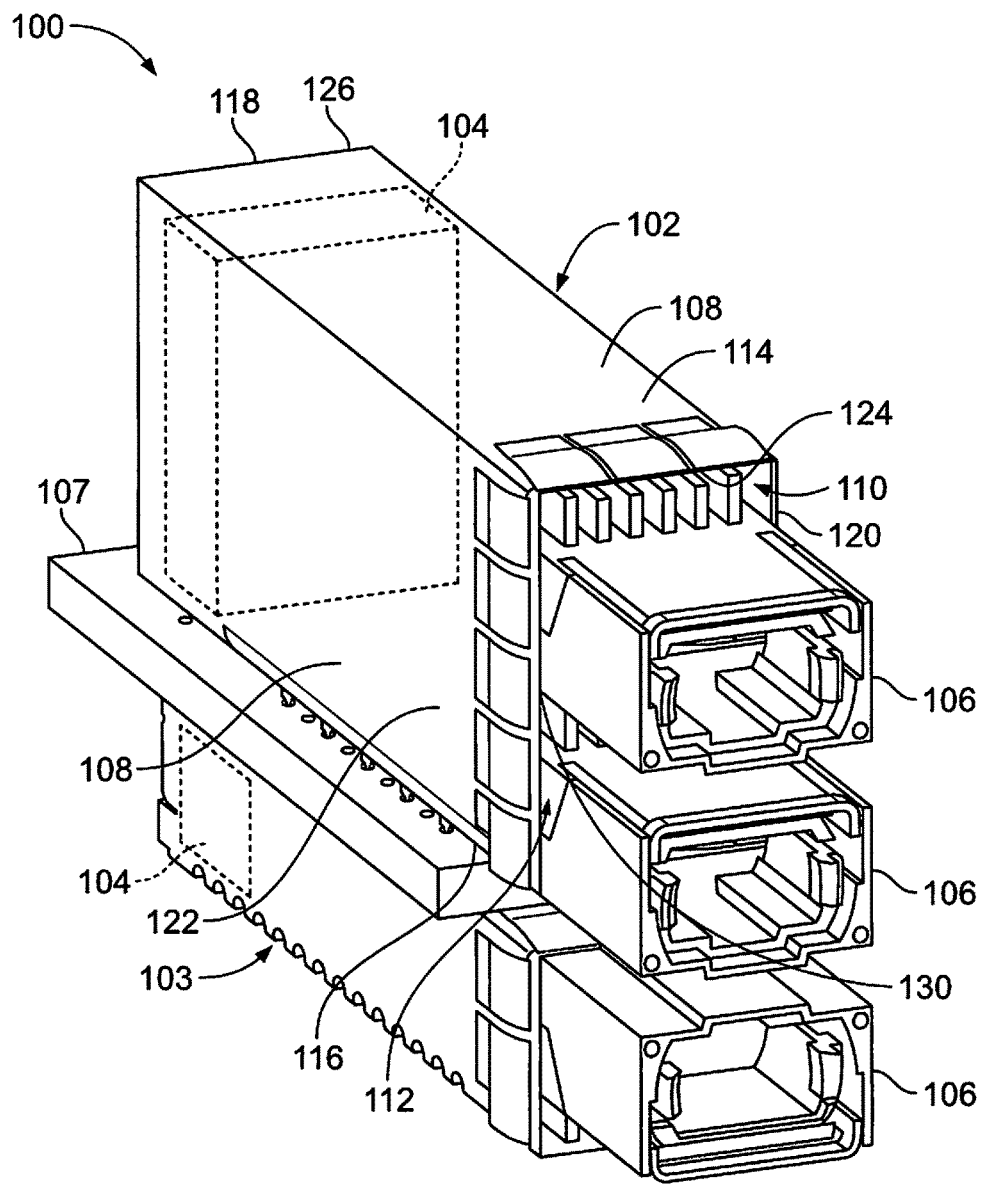
FIG. 1 is a front perspective view of an electrical connector assembly formed in accordance with an exemplary embodiment.

FIG. 1 is a front perspective view of an electrical connector assembly 100 formed in accordance with an exemplary embodiment. The electrical connector assembly 100 includes a cage member 102 and a communication connector 104 (shown schematically in FIG. 1, also illustrated in FIG. 2) received in the cage member 102. Pluggable modules 106 are loaded into the cage member 102 for mating with the communication connector 104. The cage member 102 and communication connector 104 are intended for placement on and electrical connection to a circuit board 107, such as a motherboard. The communication connector 104 is arranged within the cage member 102 for mating engagement with the pluggable modules 106.

In an exemplary embodiment, a cage member 103 is provided on the bottom side of the circuit board 107 in addition to the cage member 102 on the top side of the circuit board 107; however the electrical connector assembly 100 may be provided without the cage member 103 in alternative embodiments. The cage member 103 receives a pluggable module 106 therein similar to the cage member 102. The cage member 103 will not be described in detail herein but may include similar features and components as the cage member 102. Additionally, while the cage member 103 is illustrated as being a single port cage member 102 rather than a double port, stacked cage member as with the cage member 102, the cage member 103 is not intended to be limited to a single port and may include any number of ports stacked and/or ganged together.

The cage member 102 is a shielding, stamped and formed cage member that includes a plurality of shielding walls 108 that define multiple ports 110, 112 for receipt of the pluggable modules 106. In the illustrated embodiment, the cage member 102 constitutes a stacked cage member having the ports 110, 112 in a stacked configuration. The port 110 defines an upper port positioned above the port 112 and may be referred to hereinafter as upper port 110. The port 112 defines a lower port positioned below the port 110 and may be referred to hereinafter as lower port 112. Any number of ports may be provided in alternative embodiments. In the illustrated embodiment, the cage member 102 includes the ports 110, 112 arranged in a single column, however, the cage member 102 may include multiple columns of ganged ports 110, 112 in alternative embodiments (for example, 2×2, 3×2, 4×2, 4×3, etc.).

The cage member 102 includes a top wall 114, a bottom wall 116, a rear wall 118 and side walls 120, 122, which together define the general enclosure or outer perimeter for the cage member 102 (the top and bottom walls 114, 116 may be defined relative to being distal and proximate, respectively, to the circuit board 107 and thus the top wall of the cage member 103 is positioned below the bottom wall of the cage member 103 when viewed in FIG. 1). When ganged in multiple columns of ports 110, 112, at least some of the walls 108 may be interior divider walls defining side walls 120 or 122 for two different columns of ports 110, 112. Optionally, the top wall 114 may be non-planar and may be stepped downward at the rear, such as above the communication connector 104 (for example, rearward of the pluggable module 106), to improve airflow through the cage member 102.

The cage member 102 extends between a front end 124 and a rear end 126. The communication connector 104 may be positioned at the rear end 126 of the cage member 102, such as immediately adjacent the rear end 126 or slightly forward of the rear end 126 and remote from the front end 124. The pluggable modules 106 are configured to be loaded into the ports 110, 112 through the front end 124. Optionally, at least a portion of the bottom wall 116 may be open to allow the communication connector 104 to interface with the circuit board 107.

In an exemplary embodiment, the walls 108 may include a plurality of airflow openings or channels to allow airflow therethrough, such as from front to back, back to front and/or side to side. The airflow openings help cool the walls 108, the ports 110, 112 and/or the pluggable modules 106. The airflow openings may have any size and shape. In an exemplary embodiment, the size, shape, spacing and/or positioning of the airflow openings may be selected with consideration to thermal performance, shielding performance (for example electromagnetic interference (EMI) shielding), electrical performance, or other design considerations. Optionally, the stepped portion of the top wall 114 may include airflow openings.

The cage member 102 is subdivided by one or more divider walls 130. In the illustrated embodiment, the divider wall 130 extends horizontally between the side walls 120, 122. The divider wall 130 separates the upper port 110 from the lower port 112. In some embodiments, the divider wall 130 may be a single, planar wall. Alternatively, the divider wall 130 may be U-shaped having two parallel walls with a joining wall therebetween at the front end 124 and having a channel between the two parallel walls, such channel allowing airflow between the upper and lower ports 110, 112.

FIG. 2 is a front perspective view of the communication connector 104 in accordance with an exemplary embodiment with communication connector light pipes 250. FIG. 3 is a front perspective view of the communication connector 104 with the communication connector light pipes 250 poised for assembly. The communication connector light pipes 250 transmit connection status of the communication connector 104, such as connection status with the pluggable module(s) 106 (shown in FIG. 4). The connection status may relate to proper connection of the pluggable module, power, fault with the line(s), data transmission, or other types of connection status. The communication connector light pipes 250 are configured to be mounted near the circuit board 107 (shown in FIG. 1) to receive light from light sources 252 (represented schematically in FIG. 2) mounted to the circuit board 107. The light sources 252 may be light emitting diodes (LEDs) or other types of light sources.

The communication connector 104 includes a housing 200 defined by an upstanding body portion 202 having a top 203, sides 204, 205, a rear 206, a mounting face 208 configured to be mounted to the circuit board 107 (shown in FIG. 1), and a mating face 210 opposite the rear 206. Upper and lower extension portions 212 and 214 extend from the body portion 202 to define a stepped mating face 210. For example, the extension portions 212, 214 and a recessed face 216 between the extension portions 212, 214 may define the mating face 210 of the body portion 202. For a single port cage member, the communication connector 104 may only include a single extension portion. The body portion 202 and extension portions 212, 214 may be co-molded from a dielectric material, such as a plastic material, to form the housing 200.

Circuit card receiving slots 220 and 222 extend inwardly from the mating face 210 of each of the respective upper and lower extension portions 212, 214, and extend inwardly to the body portion 202. The circuit card receiving slots 220, 222 are configured to receive card edges of circuit cards of the corresponding pluggable modules 106. A plurality of contacts 224 are held by the housing 200 and are exposed within the circuit card receiving slots 220, 222 for mating with contact pads on the edge of the circuit card of the corresponding pluggable module 106. Optionally, the contacts 224 may be parts of chicklets or contact modules stacked together and loaded into the housing 200 through the rear 206. Alternatively, the contacts 224 may be individual contacts stitched into the housing 200 or otherwise loaded into the housing 200. The contacts 224 and circuit card receiving slots 220, 222 define first and second mating interfaces 226, 228, respectively, of the communication connector 104.

The contacts 224 extend from the mounting face 208 for termination to the circuit board 107. For example, the ends of the contacts 224 may constitute pins that are loaded into plated vias of the motherboard. Alternatively, the contacts 224 may be terminated to the circuit board 107 in another manner, such as by surface mounting to the circuit board 107.

The upper and lower extension portions 212, 214, circuit card receiving slots 220, 222 and contacts 224 may define identical mating interfaces 226, 228 such that the mating interfaces 226, 228 are configured to mate with any pluggable module (for example, any pluggable module 106 may be plugged into the upper port or the lower port for connection to the communication connector 104. The extension portions 212, 214 each include a top surface 230, a bottom surface 232 and side surfaces 234, 236 to provide a generally box-shaped extension. The extension portions 212, 214 may have other surfaces to have other shapes in alternative embodiments. The surfaces 230-236 may extend to the mating faces 210 of the extension portions 212, 214.

In an exemplary embodiment, the housing 200 includes tracks 240 that receive the communication connector light pipes 250. The tracks 240 may be provided along any portions of the housing 200 for routing of the communication connector light pipes 250. In the illustrated embodiment, the tracks 240 extend along the sides 204, 205, at or near the mating face 210. The tracks 240 extend to the extension portions 212, 214. Optionally, the tracks 240 may extend along the extension portions 212, 214, such as along the side surfaces 234, 236 at or near the bottom surface 232. In an exemplary embodiment, the tracks 240 are provided along both sides 204, 205 and both side surfaces 234, 236 to provide a pair of communication connector light pipes 250 for each of the extension portions 212, 214, and thus present two indicator signals to each pluggable module 106. Greater or fewer communication connector light pipes 250 and corresponding tracks 240 may be provided to each pluggable module 106 in alternative embodiments.

The tracks 240 include retention features to hold the communication connector light pipes 250 therein. For example, the communication connector light pipes 250 may be snap-fit into the tracks 240. The tracks 240 include alignment features for aligning the communication connector light pipes 250 relative to the housing 200. For example, surfaces of the tracks 240 may provide vertical and/or horizontal alignment of the communication connector light pipes 250.

Optionally, the tracks 240 may be open sided to allow insertion of the communication connector light pipes 250 into the tracks 240 through such open sides. Alternatively, the tracks 240 may be closed to secure or hold the communication connector light pipes 250 therein. For example, in various embodiments, the communication connector light pipes 250 may be loaded into the tracks 240 through openings. Optionally, the housing 200 may be molded around the communication connector light pipes 250 in some various embodiments. In other various embodiments, the housing 200 itself may define the communication connector light pipes 250 rather than having separate communication connector light pipes 250 coupled to the housing 200, such as by manufacturing portions of the housing 200 with light transmissive material to direct light along predetermined paths.

Each communication connector light pipe 250 may have a clear, solid body formed from a light transmissive plastic material, such as acrylic and/or polycarbonate. In alternative embodiments, other suitable materials may be used for the communication connector light pipe 250. The communication connector light pipe 250 may be a generally slender rod or tube, having a circular or elliptical cross-section. The communication connector light pipe 250 may be straight or may have at least one bend 254, as shown in FIGS. 2 and 3. The material and shape of the communication connector light pipe 250 permits light generated by one or more of the light sources 252 to propagate through the communication connector light pipe 250 along a length of the communication connector light pipe 250 through internal reflection.

The communication connector light pipe 250 includes a receiving portion 256 and an emitting portion 258 opposite the receiving portion 256. The receiving portion 256 receives light from the one or more light sources 252. In the illustrated embodiment, the receiving portion 256 is positioned generally at the mounting face 208 to receive light from the light source 252 mounted to the circuit board 107. Other orientations are possible in alternative embodiments, for receiving light from light sources 252 at other locations, such as from behind the housing 200. The receiving portions 256 may receive light from other light pipes rather than receiving light directly from the light sources 252.

The light is emitted from the emitting portion 258, such as at an emitting face 260. In an exemplary embodiment, the emitting face 260 is generally flush with the mating face 210 of the corresponding extension portion 212, 214. The emitting portion 258 is configured to be received in the pluggable module 106 with the corresponding extension portion 212, 214 such that the light is emitted from the communication connector light pipe 250 into the pluggable module 106. Alternatively, rather than being received in the pluggable module 106, the emitting portion 258 may be oriented to direct light at the pluggable module 106.

Other types of communication connectors may be provided in alternative embodiments. For example, the communication connector may have a different mating interface. The communication connector light pipes may be shaped or positioned differently. The housing may be shaped differently. The communication connector may have different types of contacts. For example, the communication connector may have contacts configured to mate with another type of pluggable module, such as a pluggable module that does not include a circuit card. Optionally, the communication connector may include multiple communication connector members that are stacked, with each communication connector member having a single mating interface and separately mountable to the circuit board.

Figure 4:
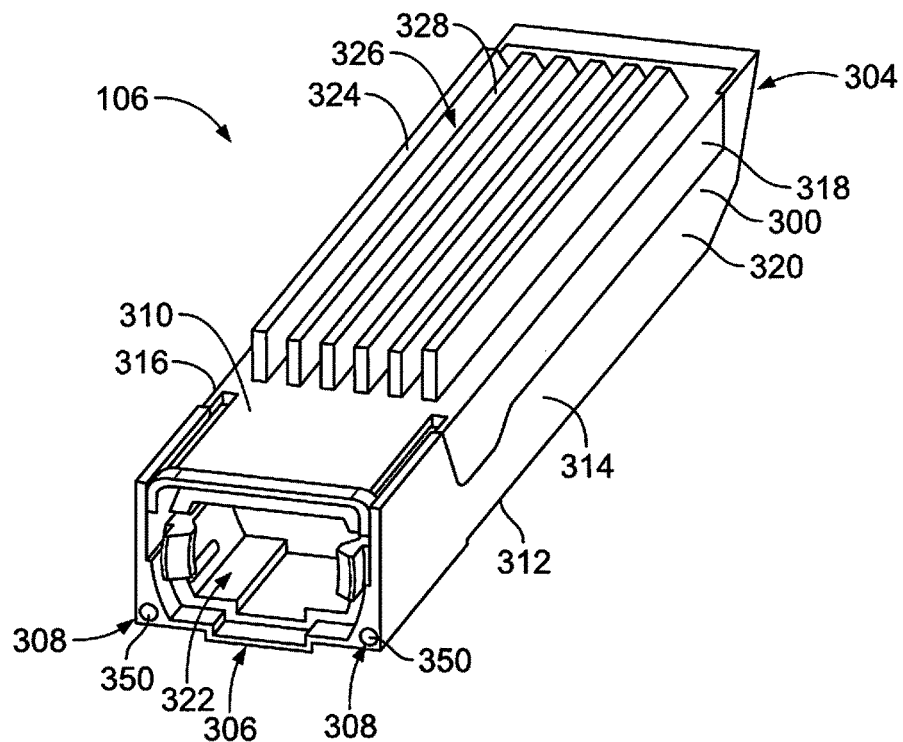
FIG. 4 illustrates an exemplary embodiment of a pluggable module of the electrical connector assembly in accordance with an exemplary embodiment.

FIG. 4 illustrates an exemplary embodiment of the pluggable module 106 for use with electrical connector assembly 100 (shown in FIG. 1). In the illustrated embodiment, the pluggable module 106 constitutes a small form-factor pluggable (SFP) module; however other types of pluggable modules or transceivers may be used in alternative embodiments. The pluggable module 106 includes a metal body or shell 300 holding a circuit card 302 (FIG. 5) at a mating end 304 thereof for interconnection into one of the circuit card receiving slots 220 or 222 (shown in FIGS. 2 and 3) of the communication connector 104 (shown in FIGS. 2 and 3).

The pluggable module 106 includes an electrical interconnection within the module to an interface at a cable end 306 of the pluggable module. For example, a copper interface may be provided in the way of a modular jack, or an optical interface may be provided in the way of a fiber optic connector for further interfacing. Optionally, a cable, such as an electrical cable or an optical cable, may extend from the cable end 306 and be terminated inside the shell 300, such as directly to the circuit card 302 or to a connector mounted to the circuit card 302 at or near the cable end 306.

In an exemplary embodiment, the pluggable module 106 includes one or more indicator openings 308 at the cable end 306. The indicator openings 308 receive portions of pluggable module light pipes 350 used to emit light to indicate connection status of the pluggable module 106 with the communication connector 104. For example, the pluggable module light pipes 350 may receive light from the communication connector light pipes 250 (shown in FIGS. 2 and 3) and transmit the light to the cable end 306 where the pluggable module light pipes 350 are visible. Optionally, the pluggable module light pipes 350 may be routed internally within the shell 300 of the pluggable module 106. Alternatively, the pluggable module light pipes 350 may be routed, at least in part, along the exterior surface of the pluggable module 106 to the cable end 306 (or at least visible at the cable end 306).

The shell 300 has a top 310, a bottom 312 and sides 314, 316 between the top 310 and the bottom 312. In an exemplary embodiment, the shell 300 is a two-part shell having an upper shell 318 and a lower shell 320. The upper and lower shells 318, 320 define a chamber 322 that receives the circuit card 302. The chamber 322 may be open at the mating end 304 to expose the circuit card 302 for mating with the communication connector 104. For example, the extension portions 212, 214 may be loaded into the chamber 322 through the mating end 304. In an exemplary embodiment, portions of the communication connector light pipes 250 may be loaded into the chamber 322, such as for mating with the pluggable module light pipes 350. The upper and lower shells 318, 320 are coupled together at a seam that extends generally along the sides 314, 316. The upper and lower shells 318, 320 may be snapped together and/or may be secured together using fasteners.

Optionally, the pluggable module 106 may include thermal interface features 324 configured to provide a thermal interface with the cage member 102 (shown in FIG. 1), such as for direct thermal contact with the cage member 102 or for arrangement in an airflow channel of the corresponding port to allow airflow through the port along the thermal interface features 324.

In the illustrated embodiment, the thermal interface features 324 are heat dissipation fins and may be referred to hereinafter as heat dissipation fins 324. The heat dissipation fins 324 may extend from any portion of the shell 300, such as the top 310, the bottom 312 and/or the sides 314, 316. In an exemplary embodiment, the shell 300 is thermally conductive, such as a metal material, and the heat dissipation fins 324 dissipate heat from the shell 300. The heat dissipation fins 324 extend longitudinally at least partially between the mating end 304 and the opposite cable end 306 of the shell 300. The heat dissipation fins 324 have channels 326 between the heat dissipation fins 324 that allow airflow along the shell 300 and the heat dissipation fins 324, which cools the pluggable module 106. The heat dissipation fins 324 have outer edges 328. The outer edges 328 may be configured to engage portions of the cage member 102 when loaded therein. In alternative embodiments, the pluggable module 106 may not include heat dissipation fins.

The pluggable module 106 may include a latching feature for securing the pluggable module 106 in the cage member 102. The latching feature may be releasable for extraction of the pluggable module 106. Other types of pluggable modules or transceivers may be utilized in alternative embodiments.

Figure 5:
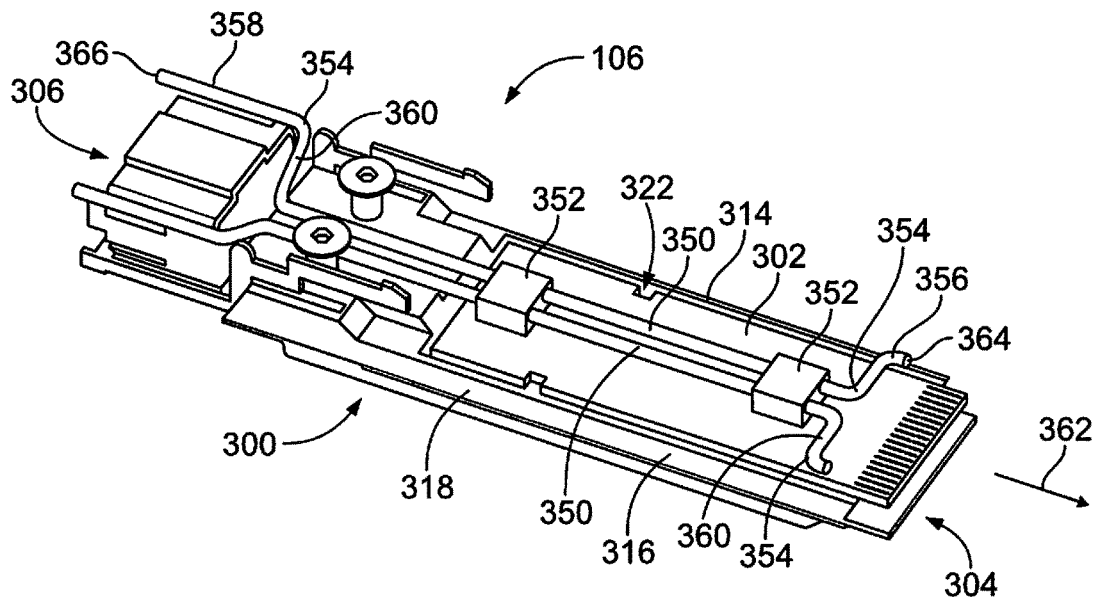
FIG. 5 is a bottom view of a portion of the pluggable module showing pluggable module light pipes.
Figure 6:
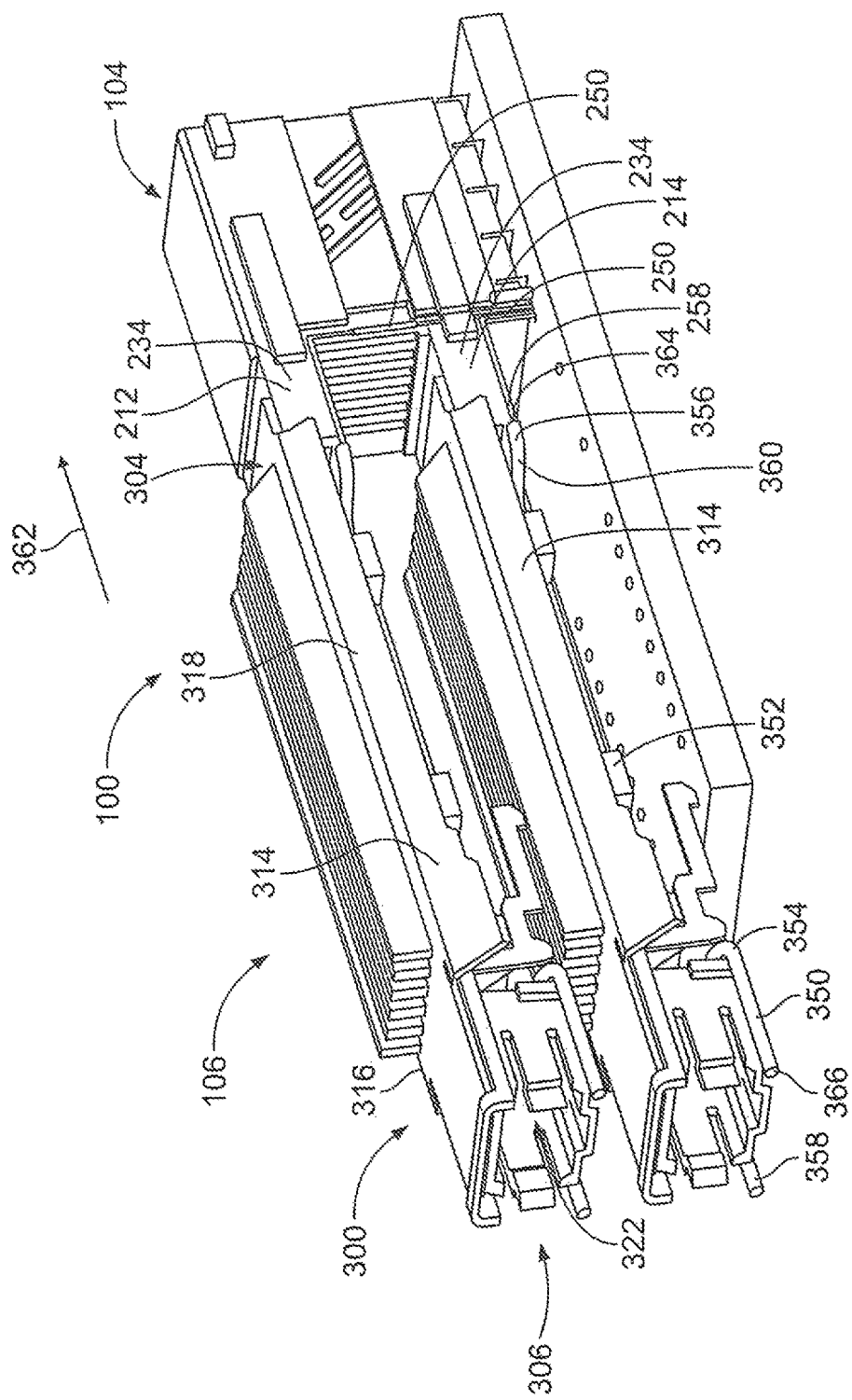
FIG. 6 is a perspective view of a portion of the electrical connector assembly showing portions of pluggable modules mated with the communication connector.

FIG. 5 is a bottom view of a portion of the pluggable module 106 showing the upper shell 318, the circuit card 302 and the pluggable module light pipes 350. FIG. 6 is a perspective view of a portion of the electrical connector assembly 100 showing the pluggable modules 106 mated with the communication connector 104. The lower shell 320 (shown in FIG. 4) is removed in FIGS. 5 and 6 to illustrate the internal portions of the pluggable module 106. The circuit card 302 (FIG. 5) is held in the chamber 322 defined by the upper shell 318 (and the lower shell 320) and presented at the mating end 304 for mating with the communication connector 104 (FIG. 6). For example, the circuit card 302 may be plugged into the corresponding circuit card receiving slots 220 or 222 (shown in FIGS. 2 and 3) when the extension portions 212, 214 (FIG. 6) are received in the chamber 322.

The pluggable module 106 includes alignment blocks 352 used to support and position the pluggable module light pipes 350. The alignment blocks 352 may be mounted to the circuit card 302 and thus position the pluggable module light pipes 350 relative to the circuit card 302. Alternatively, the alignment blocks 352 may be mounted to the upper shell 318 (or the lower shell 320) and thus position the pluggable module light pipes 350 relative to the shell 300. Any number of alignment blocks 352 may be provided. Each alignment block 352 may support one, two or more of the pluggable module light pipes 350. The alignment blocks 352 may restrict side-to-side movement, up-and-down movement and/or front-to-back movement of the pluggable module light pipes 350.

Each pluggable module light pipe 350 may have a clear, solid body formed from a light transmissive plastic material, such as acrylic and/or polycarbonate. In alternative embodiments, other suitable materials may be used for the pluggable module light pipe 350. The pluggable module light pipe 350 may be generally rod-like, having a circular or elliptical cross-section. The pluggable module light pipe 350 may be straight or may have at least one bend 354, as shown in FIG. 5. The material and shape of the pluggable module light pipe 350 permits light to propagate through the pluggable module light pipe 350 along a length of the pluggable module light pipe 350 through internal reflection.

The pluggable module light pipe 350 includes a receiving portion 356 and an indicator portion 358 opposite the receiving portion 356. The receiving portion 356 receives light from a corresponding emitting portion 258 (FIG. 6) of the communication connector light pipe 250 (FIG. 6). In the illustrated embodiment, the receiving portion 356 is positioned near the mating end 304 of the pluggable module 106. For example, the receiving portion 356 is located near the card edge of the circuit card 302. The receiving portion 356 is located at a position to align and/or mate with the corresponding communication connector light pipe 250 to receive light from the communication connector light pipe 250. Other orientations are possible in alternative embodiments.

In the illustrated embodiment, the receiving portions 356 of the light pipes 350 are located near the sides 314, 316. The pluggable module light pipes 350 have transition portions 360 that transition the pluggable module light pipes 350 from the middle of the chamber 322 toward the sides 314, 316. As such, the pluggable module light pipes 350 may be aligned with the communication connector light pipes 250 along the side surfaces 234, 236 (shown in FIGS. 2 and 3). The bends 354 and transition portions 360 allow the receiving portions 356 of the pluggable module light pipes 350 to flex or move parallel to a mating direction 362. Such flexing or moving allows interference between a receiving face 364 of each pluggable module light pipe 350 and the emitting face 260 (identified in FIGS. 2 and 3) of the corresponding communication connector light pipe 250 during mating, which may reduce damage to the light pipes 250, 350. The flexing allows for overtravel of the pluggable module 106 during mating with the communication connector 104.

The light is transmitted along the length of the pluggable module light pipe 350 to the indicator portion 358. The light is emitted from the indicator portion 358, such as at an emitting face 366. In an exemplary embodiment, the emitting face 366 is generally flush with the cable end 306 of the pluggable module 106. The indicator portions 358 may be received in corresponding indicator openings 308 (shown in Figure 4) of the shell 300. The light is emitted from the indicator portions 358 and is visible exterior of the pluggable module 106, such as forward of the cable end 306 for a viewer to acknowledge the connection status of the electrical connector assembly 100.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical connector assembly comprising:
    a cage member having a plurality of walls defining a port configured to receive a pluggable module therein through a front end of the cage member, the port extending to a rear end of the cage member, the walls being manufactured from a conductive material and providing electrical shielding;
    a communication connector disposed within the cage member and positioned at the rear end of the cage member to mate with the pluggable module when the pluggable module is inserted into the port, the communication connector having a mating face being forward facing; and
    a communication connector light pipe mounted to the communication connector and provided at the mating face, the communication connector light pipe having an emitting face emitting light into the pluggable module.

2. The electrical connector assembly of claim 1, wherein the communication connector includes a mounting face configured to be mounted onto a circuit board, the communication connector light pipe extending to the mounting face to receive light from a light source mounted to the circuit board.

3. The electrical connector assembly of claim 1, wherein the communication connector includes an extension portion extending from a recessed face of the mating face, the extension portion being configured to be received in the pluggable module, the communication connector light pipe extending along the extension portion such that the emitting face of the communication connector light pipe is received in the pluggable module.

4. The electrical connector assembly of claim 1, wherein the communication connector includes an exterior, the communication connector light pipe being routed along the exterior between a light source on a circuit board and the emitting face.

5. The electrical connector assembly of claim 1, wherein the communication connector includes a track receiving the communication connector light pipe.

6. The electrical connector assembly of claim 1, wherein a plurality of the communication connector light pipes are mounted to the communication connector and provided at the mating face.

7. The electrical connector assembly of claim 1, wherein the communication connector light pipe transmits light relating to a connector status of the communication connector to the pluggable module.

8. The electrical connector assembly of claim 1, wherein the emitting face is remote from the front end of the cage member and is located within the port.

9. The electrical connector assembly of claim 1, wherein the emitting face is flush with the mating face of the communication connector.

10. An electrical connector assembly comprising:
    a cage member having a plurality of walls defining a port extending between a front end and a rear end of the cage member, the walls being manufactured from a conductive material and providing electrical shielding;
    a communication connector disposed within the cage member and positioned at the rear end of the cage member, the communication connector having a mating face being forward facing, the communication connector having a circuit card receiving slot and a plurality of contacts exposed in the circuit card receiving slot;

a communication connector light pipe mounted to the communication connector and provided at the mating face, the communication connector light pipe having an emitting portion emitting light therefrom;

a pluggable module received in the port, the pluggable module having a circuit card held in a chamber of a shell, the shell extending between a mating end and a cable end of the pluggable module, the pluggable module being mated with the communication connector such that the circuit card is received in the circuit card receiving slot and is electrically connected to the contacts of the communication connector; and a pluggable module light pipe extending generally between the mating end and the cable end of the pluggable module, the pluggable module light pipe having a receiving portion receiving light from the emitting portion of the communication connector light pipe, the pluggable module light pipe having an indicator portion opposite the receiving portion and provided at the cable end, the indicator portion emitting light received from the communication connector light pipe to indicate a connection status of the pluggable module with the communication connector.

11. The electrical connector assembly of claim 10, wherein the indicator portion is visible at the cable end of the pluggable module exterior of the cage member.

12. The electrical connector assembly of claim 10, wherein the pluggable module light pipe extends from the interior of the port to the exterior of the cage member.

13. An electrical connector assembly comprising:

a cage member having a plurality of walls defining a port extending between a front end and a rear end of the cage member, the walls being manufactured from a conductive material and providing electrical shielding;

a communication connector disposed within the cage member and positioned at the rear end of the cage member, the communication connector having a mating face being forward facing, the communication connector having a circuit card receiving slot and a plurality of contacts exposed in the circuit card receiving slot;

a pluggable module received in the port, the pluggable module having a circuit card held in a chamber of a shell, the shell extending between a mating end and a cable end of the pluggable module, the pluggable module being mated with the communication connector such that the circuit card is received in the circuit card receiving slot and is electrically connected to the contacts of the communication connector; and a pluggable module light pipe received in the chamber of the shell of the pluggable module, the pluggable module light pipe having an indicator portion provided at the cable end of the pluggable module, the indicator portion emitting light to indicate a connection status of the pluggable module with the communication connector, wherein the pluggable module light pipe includes a receiving portion opposite the indicator portion, the receiving portion receiving light from a communication connector light pipe associated with the communication connector.

14. The electrical connector assembly of claim 13, wherein the indicator portion is visible at the cable end of the pluggable module exterior of the cage member.

15. The electrical connector assembly of claim 13, wherein the pluggable module light pipe extends from the interior of the port to the exterior of the cage member.

16. The electrical connector assembly of claim 13, wherein the receiving portion is in the chamber.

17. The electrical connector assembly of claim 13, wherein the pluggable module includes an alignment block mounted to the circuit card, the alignment block supporting and positioning the pluggable module light pipe relative to the circuit card.

18. The electrical connector assembly of claim 13, wherein the shell includes an indicator opening at the cable end, the indicator opening receiving the indicator portion of the pluggable module light pipe.

19. The electrical connector assembly of claim 13, wherein the pluggable module light pipe extends along and engages the shell of the pluggable module.

* * * * *